United States Patent
Cundiff, Sr.

(10) Patent No.: US 6,301,213 B1
(45) Date of Patent: Oct. 9, 2001

(54) USING A TOP-HINGED SHUTTER ON A DRIVE TO SUPPLY A RETAINING FORCE TO HOLD A DISC IN POSITION FOR VERTICAL INSERTION

(75) Inventor: Raymond M Cundiff, Sr., Loveland, CO (US)

(73) Assignee: Hewelett-Packard Company, Palo Alto, CA (US)

( * ) Notice: Subject to any disclaimer, the term of this patent is extended or adjusted under 35 U.S.C. 154(b) by 0 days.

(21) Appl. No.: 09/410,878

(22) Filed: Oct. 4, 1999

(51) Int. Cl.$^7$ ............................. G11B 17/04; G11B 33/02
(52) U.S. Cl. .............................................. 369/75.2
(58) Field of Search ................... 369/75.1, 75.2, 369/77.1

(56) References Cited

U.S. PATENT DOCUMENTS

| 4,744,072 | 5/1988 | Tamaki et al. | 369/75.2 |
|---|---|---|---|
| 4,862,445 | 8/1989 | Sasaki | 369/75.2 |
| 5,737,304 | 4/1998 | Soga et al. | 369/247 |
| 5,781,523 | 7/1998 | Ozawa et al. | 369/77.1 |
| 5,805,554 | 9/1998 | Suzuki et al. | 369/77.1 |
| 5,878,013 | 3/1999 | Maeda et al. | 369/77.1 |
| 5,930,218 | 7/1999 | Mitsui et al. | 369/77.1 |

FOREIGN PATENT DOCUMENTS

| 6-007266 | 1/1981 | (JP) . |
|---|---|---|
| 3-271754 | 11/1988 | (JP) . |
| 1-150268 | 6/1989 | (JP) . |
| 2-118983 | 5/1990 | (JP) . |
| 5-198068 | 8/1993 | (JP) . |
| 6-251479 | 9/1994 | (JP) . |
| 7-312074 | * 11/1995 | (JP) . |
| 8-007430 | 1/1996 | (JP) . |
| 8-045153 | * 2/1996 | (JP) . |
| 8-096565 | * 4/1996 | (JP) . |
| 8-235715 | 9/1996 | (JP) . |
| 9-134567 | * 5/1997 | (JP) . |
| 9-245406 | 9/1997 | (JP) . |
| 9-251692 | 9/1997 | (JP) . |
| 9-251693 | 9/1997 | (JP) . |
| 9-320162 | 12/1997 | (JP) . |
| 10-302363 | 11/1998 | (JP) . |
| 11-039761 | 2/1999 | (JP) . |
| 11-039762 | 2/1999 | (JP) . |
| 11-167760 | 6/1999 | (JP) . |

* cited by examiner

Primary Examiner—William Klimowicz

(57) ABSTRACT

A shutter is utilized to maintain an optical disc within a receptacle during loading/unloading of the disc to/from an optical drive. The optical drive comprises a receptacle operable to transport a disc to/from the drive by extending from and retracting into the drive. Such receptacle comprises a top side that receives a disc. The optical drive further comprises a shutter that extends from the drive over at least a portion of the top of the receptacle, wherein such shutter applies force toward the top of the receptacle when the receptacle is extended from the drive. Such force is sufficient to maintain a disc in the receptacle when oriented vertically. In a preferred embodiment, the shutter is hinged wherein it is rotatably connected to the optical drive such that it opens upward when the receptacle extends from the drive and closes downward when the receptacle retracts into the drive. Additionally, the shutter comprises at least one shutter projection that engage a disc contained in the receptacle to prevent the disc from inadvertently falling out of the receptacle when oriented vertically. In a preferred embodiment, a user places a disc between the receptacle and the shutter, and the shutter maintains pressure against such disc to maintain the disc in the receptacle. Accordingly, in a preferred embodiment, a user can easily place a disc into a vertically oriented receptacle with little effort and little potential for damaging the disc.

20 Claims, 2 Drawing Sheets

# USING A TOP-HINGED SHUTTER ON A DRIVE TO SUPPLY A RETAINING FORCE TO HOLD A DISC IN POSITION FOR VERTICAL INSERTION

RELATED APPLICATIONS

This application is related to co-pending and commonly owned U.S. patent application Ser. No. 09/411,755 filed concurrently herewith, entitled "UNIQUE TRAY GEOMETRY TO ALLOW FOR VERTICAL LOADING OF OPTICAL DISC IN OPTICAL DRIVE," and co-pending and commonly owned U.S. patent application Ser. No. 09/912,036 filed concurrently herewith, entitled "ORIENTATION OF DRIVE MECHANICS TO ALLOW FOR DISC LOADING IN AN OFF-AXIS POSITION," which are hereby incorporated herein by reference.

TECHNICAL FIELD

This application relates in general to optical drives, and in specific to a method, system and apparatus for vertically loading/unloading an optical disc in an optical drive.

BACKGROUND

Optical discs, such as compact discs (CDs) and digital versatile discs (DVDs), are widely used for storing data, such as textual data, audio data, and video data. Optical drives are available in the prior art for reading data from and/or writing data to such optical discs. Prior art optical drives typically include a carrier component or receptacle, such as a "tray," that operates to receive an optical disc and hold the disc in place while the disc is being transported or "fed" into the optical drive. For example, a personal computer (PC) can include a CD drive for reading CDs. Such CD drive will typically include a tray that extends from the drive to receive a CD, and then retracts back into the drive transporting such a received CD into the optical drive.

Optical drives have traditionally been positioned horizontally, such that an optical disc can lay flat on the optical drive's tray. However, some optical drives of the prior art are positioned vertically, such that an optical disc is received into the drive in an upright position. Because the optical disc is placed into the tray of a vertical optical drive in an upright position, rather than laying flat on such a tray (as with horizontal drives), a mechanism is required in the prior art for holding the optical disc securely in the tray. That is, a mechanism is required for prior art vertical drives for holding the optical disc securely in the drive's tray to prevent the optical disc from falling out of the tray. Typically, adjustable tabs have been utilized in the prior art to hold an optical disc in place in the tray. Such tabs generally extend from the edge of the tray over the optical disc to prevent the disc from falling out of the tray.

Turning to FIG. 1, an example of a prior art optical drive 120 having a tray 102 extending therefrom is illustrated. As shown, hinged door 122 may be included on optical drive 120. Typically, door 122 opens downward (e.g., rotates downward) below tray 102 when tray 102 is extended from optical drive 120, as shown in FIG. 1. Door 122 typically closes upward (e.g., rotates upward) once tray 102 reacts into optical drive 120. Adjustable tabs 104 are included on tray 102 to hold optical disc 106 in tray 102 as the tray retracts into the optical drive. Typically, such tabs 104 can be manually adjusted radially by a user to extend over optical disc 106. That is, a prior art tray 102 will typically include radially adjustable tabs 104 that can each be manually extended by a user to hold a disc 106 in tray 102 when positioned vertically. For example, as shown in FIG. 1, tabs 104₁ and 104₂ have been radially extended over optical disc 106 and tabs 104₃ and 104₄ have not been so extended by a user.

Generally, both horizontally positioned drives 120 and vertically positioned drives 120 include such adjustable tabs 104. Horizontally positioned drives 120 typically include such tabs 104 to allow users the ability to place the drive 120 in a vertical, rather than horizontal position. For example, an optical drive 120 can be included in a PC such that the drive 120 is positioned horizontally when the PC's case is laying flat. However, the drive's tray may include adjustable tabs 104 to allow a user to reposition the PC such that the optical drive 120 is positioned vertically (e.g., stand the case on its side), wherein the adjustable tabs can be manually extended by a user to allow an optical drive's tray 102 to hold an optical disc 106 in such a vertical position.

During operation, the optical drive 120 typically lifts the optical disc 106 off of the tray 102, such that the optical disc 106 is clear of the tray's surface. Moreover, the adjustable tabs 104 are typically positioned at a height 110 above the optical disc 106 such that the optical disc 106 does not contact the tabs 104 when lifted off of tray 102 (i.e., during operation of the optical drivel 120). Typically, height 110 is approximately 5 millimeters. Accordingly, during operation, the optical drive's spindle lifts the optical disc 106 off of the tray 102, and the disc 106 spins beneath the adjustable tabs 104 without contacting such tabs 104. As a result, the overall height 108 of the tray 102 (which may also be thought of as the tray's "thickness" or the tray's "width" when the tray 102 is oriented vertically) is required to be larger than the height 110 necessary for operating with the tabs 104 extended.

Alternatively, prior art tabs 104 may be elevationally adjustable, such that the tabs 104 raise or rotate upward away from optical disc 106. For example, optical drive 120 may elevationally adjust the tabs 104 by causing the tabs 104 to rotate upward away from optical disc 106 during operation of the drive 120 to allow for sufficient space for the optical disc 106 to spin beneath the tabs 104. Thus, the height 110 may be reduced until disc 106 is transported into the optical drive 120, and thereafter height 110 is effectively increased by the optical drive 120 elevationally adjusting the tabs 104. In such case, sufficient space is required once tray 102 is inserted within the optical drive 120 to allow the tabs 104 to rotate upward away from optical disc 106 in the manner described above. Accordingly, height 108 of tray 102 is effectively increased because the tabs 104 must elevationally adjust within the optical drive 120. A prior art tray 102 typically has a height 108 of approximately 15 millimeters or more.

For ease of explanation and consistency, the dimension 108 of an optical disc tray 102 will be referred to herein as the tray's "height" or "thickness" while the dimension 112 will be referred to herein as the tray's "length" and the dimension 114 will be referred to herein as the tray's "depth." Thus, for ease of explanation and consistency herein, the term "height" or "thickness" will be used to refer to dimension 108, the term "length" will be used to refer to dimension 112, and the term "depth" will be used to refer to dimension 114 of an optical drive's tray 102, regardless of whether such tray 102 is oriented horizontally or vertically.

Several problems exist with the above-described prior art. First, utilizing such adjustable tabs 104 requires that the overall height 108 of the tray 102 be larger than the height 110 necessary for operating with the tabs 104 extended. Accordingly, a low profile tray having a small overall height 108 is not available with prior art trays 102 having tabs 104. Additionally, tabs 104 are typically inconvenient for a user, and tabs 104 can damage an optical disc 106. Tabs 104 generally must be manually extended by a user. Accordingly, when operating an optical drive in a vertical position, a user is typically required to manually extend the tabs 104 to hold an optical disc 106 in tray 102 while the disc is fed to the optical drive.

Such adjustable tabs 104 require undesirable effort on the part of a user in loading and unloading an optical disc 106. A user can manually adjust the tabs 104 to load/unload a disc 106 in tray 102 such that the disc 106 does not encounter the tabs 104. For example, a user can place a disc 106 in tray 102 having tabs 104 retracted (i.e., not extended radially), and thereafter the user can manually extend the tabs 104 radially over disc 106. When the user desires to remove the disc 106, the user can manually retract the tabs 104 and then remove the disc 106 clear of the tabs 104. Manually adjusting the tabs 104 each time that a user loads/unloads a disc 106 is undesirable because it increases the amount of time and effort required in loading/unloading a disc 106. Additionally, adjusting (e.g., retracting/extending) the tabs 104 in this manner is cumbersome for a user because the user typically must hold the disc 106 in vertical tray 102 with one hand to prevent the disc 106 from falling out of the tray 102, while the user manually adjusts the tabs 104 with the user's other hand. Furthermore, such manual adjustment by a user of tabs 104 increases the potential that a user will inadvertently break or damage the tabs, thus reducing the life of the product.

Alternatively, tabs 104 can be extended by a user, and a user can physically force a disc 106 past the extended tabs 104 in loading/unloading disc 106. Thus, rather than manually adjusting the tabs 104 each time that a user loads/ unloads a disc 106 to/from tray 102, the user may leave the tabs 104 extended and physically force an optical disc past the tabs during such loading/unloading. However, contacting the tabs 104 with disc 106 in this manner can damage disc 106 and possibly result in disc 106 being unreadable by an optical drive. That is, forcing a disc 106 past the extended tabs can scratch the reflective surface of the optical disc, which may result in data loss from the disc. Also, such tabs 104 are an additional part that must be manufactured and implemented within such prior art trays 102. Accordingly, the overall cost for manufacturing and assembling such prior art trays 102 may be reduced if such additional tabs 104 were not required.

In view of the above, there exists a desire for a method, apparatus and system for vertically loading/unloading an optical disc in an optical drive. There exists a further desire for a method, apparatus and system for loading/unloading an optical disc in an optical drive that allow for a low profile receptacle to be implemented within an optical drive. There exists still a further desire for a method, apparatus and system that allow a user to easily perform vertical loading/ unloading of an optical disc in an optical drive. There exists still a further desire for a method, apparatus and system that require no added effort on the part of a user in vertically loading/unloading an optical disc in an optical drive. There exists a further desire for a method, apparatus and system for vertically loading/unloading an optical disc in an optical drive that reduce the potential for damaging an optical disc during such loading/unloading. There exists yet a further desire for a method, apparatus and system for vertically loading/unloading an optical disc in an optical drive that are readily adaptable for loading/unloading of an optical disc in any orientation. For example, there exists a desire for a method, apparatus, and system for vertically loading/ unloading an optical disc in an optical drive that are readily adaptable for horizontal loading/unloading of an optical disc. Accordingly, if an optical drive is oriented horizontally, such method, apparatus and system would be operable for horizontally loading/unloading an optical disc in such optical drive, without requiring modification.

SUMMARY OF THE INVENTION

These and other objects, features and technical advantages are achieved by a system, apparatus and method which utilize a shutter to maintain an optical disc within the disc receptacle during loading/unloading of the disc to/from an optical drive. In a preferred embodiment, the optical drive comprises a receptacle that is operable to transport an optical disc to the optical drive by extending from the optical drive and retracting into the optical drive. Such receptacle comprises a top side that receives an optical disc to be transported to/from the optical drive. In a preferred embodiment, a cavity is provided on such top side for receiving an optical disc to be transported to/from the optical drive. In a preferred embodiment, the optical drive further comprises a shutter that extends from the optical drive over at least a portion of the top side of the receptacle, wherein such shutter applies force toward the top side of the receptacle when the receptacle is extended from the optical drive. Such force is sufficient to maintain an optical disc in the receptacle when the receptacle is oriented vertically.

In a preferred embodiment, the shutter is rotatably connected to the optical drive (e.g., hinged to the optical drive) such that the shutter opens upward when the receptacle extends from the optical drive and the shutter closes downward when the receptacle retracts into the optical drive. Thus, rather than the shutter opening downward below the receptacle as typically found in the prior art, the shutter opens upward above the receptacle's area that receives an optical disc, such that the shutter can work to maintain an optical disc in such receptacle. In a most preferred embodiment, the shutter is springably attached to the optical drive with one or more springs, whereby such springs cause the shutter to apply a force toward the top side of the receptacle when the receptacle is extended from the optical drive. In a most preferred embodiment, such springs compress when the shutter opens upward and relax when the shutter closes downward.

Additionally, in a preferred embodiment, the shutter comprises at least one shutter projection that applies the force toward the top side of the receptacle when the receptacle is extended from the optical drive. In a preferred embodiment, such shutter projections engage an optical disc that is placed in the receptacle to prevent the disc from inadvertently falling out of the receptacle when the receptacle is oriented vertically. Thus, in a preferred embodiment, a user places an optical disc between the receptacle and the shutter, and the shutter projections maintain pressure against such optical disc to maintain the disc in the receptacle when the receptacle is oriented vertically.

In a preferred embodiment, the shutter extends over at least ¼ of the receptacle's diameter when the receptacle is fully extended from the optical drive. In a preferred embodiment, the shutter extends over at least ¼ of an optical disc's diameter that is contained within a receptacle that is fully extended from the optical drive. Additionally, in a preferred embodiment, the receptacle can be implemented having a relatively low profile design. Because tabs, or other maintaining mechanisms of the prior art, are not required to be included on the receptacle, the receptacle's height can be relatively small, resulting in a low profile design for the receptacle. For example, in a preferred embodiment the height of the receptacle is within the range of 10–15 millimeters.

It should be appreciated that a technical advantage of a preferred embodiment of the present invention is that a system, method and apparatus for vertically loading/unloading an optical disc in an optical drive are provided wherein a transporting receptacle has an industrially desirable, low profile design. A further technical advantage of a preferred embodiment of the present invention is that a system, method and apparatus for vertically loading/unloading an optical disc in an optical drive are provided that allow easy vertical loading/unloading of an optical disc with little effort on the part of a user and with little potential for damaging such optical disc.

A further technical advantage of a preferred embodiment of the present invention is that a system, method and apparatus for vertically loading/unloading an optical disc in an optical drive are provided wherein a user is not required to adjust any maintaining mechanisms, such as tabs, to maintain a disc in a transporting receptacle. Rather, a shutter maintains a disc in a transporting receptacle without requiring a user to adjust a maintaining mechanism. Accordingly, such shutter is less likely to be inadvertently broken or damaged by a user because a user is not required to manually adjust the shutter in order to maintain a disc in the optical drive's receptacle, and therefore such shutter will likely have a relatively longer life span than prior art mechanisms, such as tabs, utilized for maintaining an optical disc within a receptacle. Yet a further technical advantage of a preferred embodiment of the present invention is that a system, method and apparatus for vertically loading/unloading an optical disc in an optical drive are provided that are readily operable in any orientation (e.g., horizontal or vertical). Accordingly, a preferred embodiment allows for loading/unloading of an optical disc in an optical drive that is oriented in any manner (e.g., horizontally or vertically), without requiring modification or adjustments by the user.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 2:
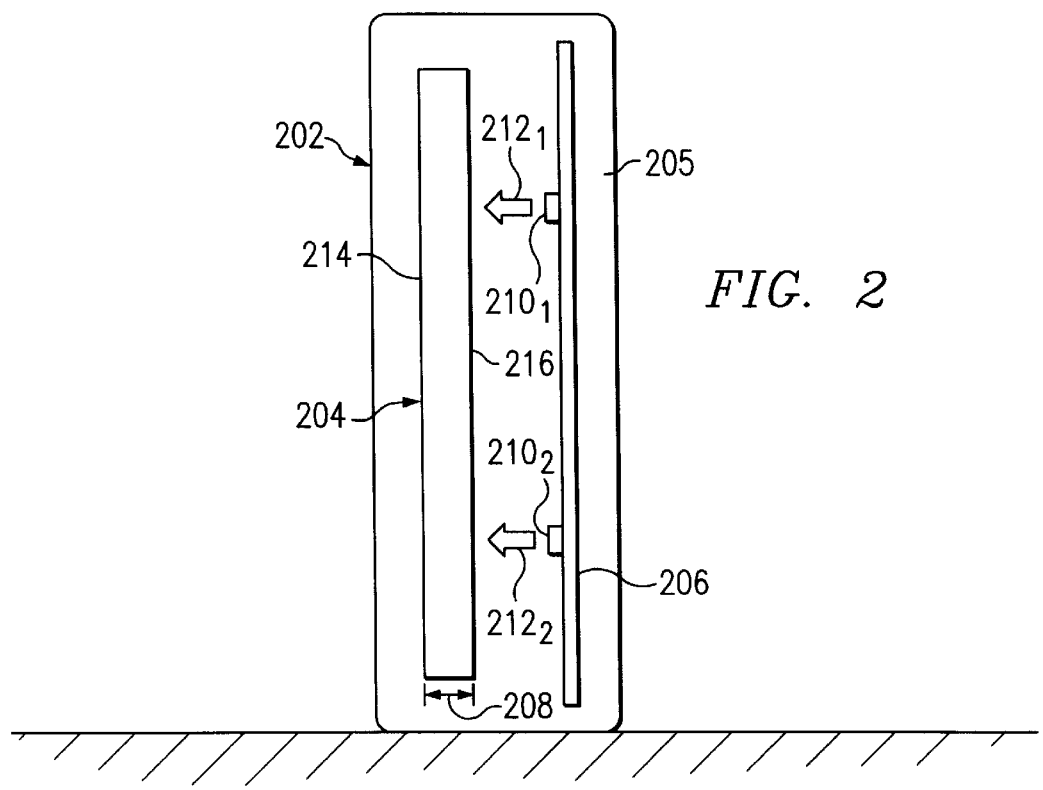
FIG. 2 shows a front view of a preferred embodiment that permits vertical loading/unloading of an optical disc to/from an optical drive.

FIG. 2 shows a front view of a preferred embodiment of the present invention. As shown, optical drive 202 comprises receptacle 204 (e.g., a tray) for receiving and transporting an optical disc to/from body 205 of optical drive 202. Additionally, optical drive 202 comprises shutter 206 (which may also be referred to as a "door" herein) that applies a force on an optical disc placed in receptacle 204 to maintain such disc in receptacle 204. As shown in FIG. 2, receptacle 204 for transporting is oriented vertically. Although, it should be understood that in a preferred embodiment the optical drive 202 and receptacle 204 may be oriented in any manner (e.g., vertically or horizontally), and such a preferred embodiment is operable for loading/unloading an optical disc in any such orientation. In a most preferred embodiment, the optical drive 202 is a CD drive. However, it should be understood that in alternative embodiments, the optical drive 202 can be any type of optical drive, including a DVD drive. It should further be understood that any type of optical discs may be utilized in a preferred embodiment, including audio optical discs, video optical discs, and multimedia optical discs.

For ease of explanation and consistency herein, the side of receptacle 204 that receives an optical disc to be loaded/unloaded to/from optical drive 202 is referred to as the top side or "top portion" 216 of receptacle 204, and the side opposite such top side is referred to as the bottom side or "bottom portion" 214 of receptacle 204, regardless of such tray's orientation (e.g., horizontal or vertical). In a preferred embodiment, shutter 206 is hinged to body 205 in a manner such that shutter 206 opens (or rotates) upward away from the top portion 216 of receptacle 204 and closes (or rotates) downward after receptacle 204 retracts into optical drive 202. Thus, in a preferred embodiment, rather than shutter 206 opening downward away from the bottom portion 214 of receptacle 204 as typically implemented in the prior art, shutter 206 opens upward away from the top portion 216 of receptacle 204. In an alternative embodiment, shutter 206 is substantially fixed and does not rotate (e.g., it does not open or close). In such an alternative embodiment, shutter 206 is fixed in a position that applies pressure or force against the top portion 216 of receptacle 204 when receptacle 204 is extended from optical drive 202.

Top portion 216 of receptacle 204 receives an optical disc to be loaded/unloaded from optical drive 202. Accordingly, shutter 206 provides resistance or force against the top portion 216 of receptacle 204 to maintain an optical disc within receptacle 204 as the disc is loaded/unloaded from optical drive 202. Thus, shutter 206 works to prevent an optical disc contained within receptacle 204 from inadvertently falling out of receptacle 204. In a preferred embodiment, shutter 206 comprises shutter projections 210 (which may also be called tabs or pads herein) that apply a force against an optical disc placed in receptacle 204 to maintain such disc within the receptacle 204. As shown in FIG. 2, shutter projections $210_1$ and $210_2$ are provided on shutter 206 to apply directional force $212_1$ and $212_2$, respectively, to an optical disc contained in receptacle 204.

Figure 3:
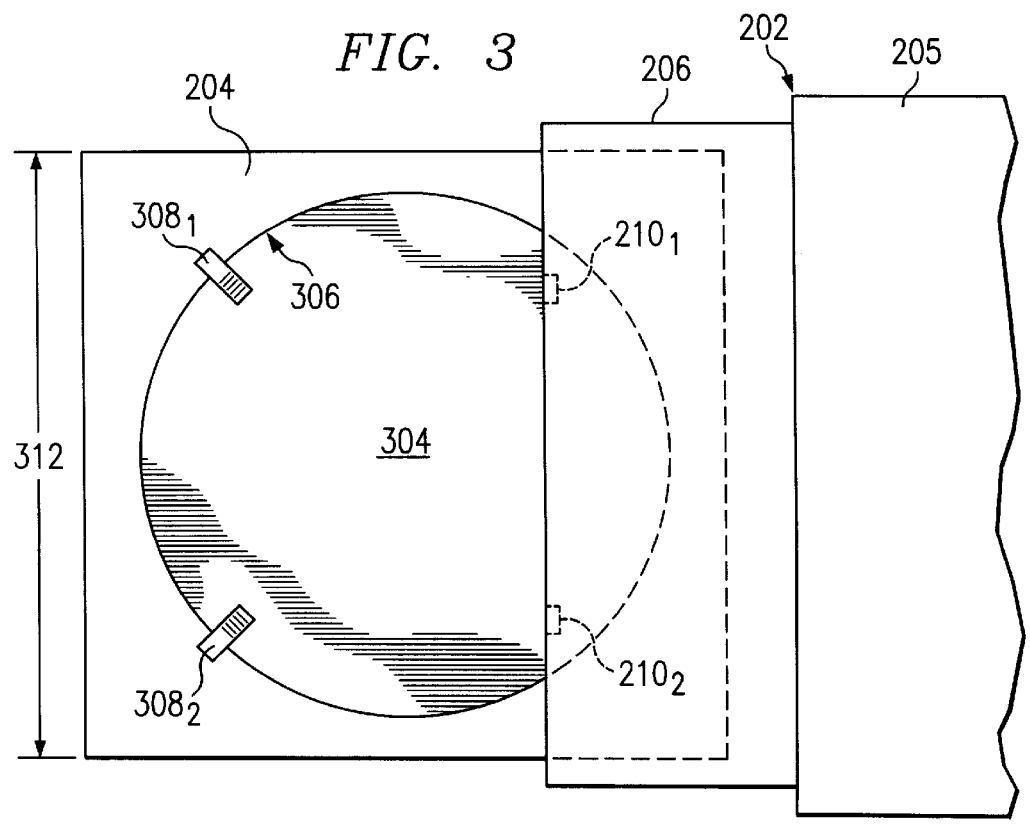
FIG. 3 shows a side view of a preferred embodiment that permits vertical loading/unloading of an optical disc to/from an optical drive.

In a most preferred embodiment, shutter 206 is springably attached to optical drive 202, whereby shutter 206 is biased to a closed position. Thus, when shutter 206 is in an open position (as shown in FIGS. 2 and 3), the spring compresses and provides resistance to shutter 206, which in turn applies resistance or force toward receptacle 204 and an optical disc that may be contained therein. When shutter 206 is in a closed position, the spring relaxes. Accordingly, as receptacle 204 extends from drive 202, shutter 206 is forced open, which compresses one or more springs coupled to shutter 206 causing shutter 206 to apply a directional force against receptacle 204 in a preferred embodiment. Moreover, when receptacle 204 retracts into optical disc 202, one or more springs coupled to shutter 206 cause shutter 206 to close, thus relaxing such one or more springs.

Even though a preferred embodiment is described herein as having shutter 206 springably attached to optical drive 202 to maintain the desired force against receptacle 204 necessary to maintain a disc within receptacle 204 during loading/unloading to/from optical drive 202, many other embodiments are possible to cause shutter 206 to apply such desired force, and any such embodiment is intended to be within the scope of the present invention. The present invention is not intended to be limited only to shutter 206 being springably attached to optical drive 202, rather such embodiment is intended as an example that renders the disclosure enabling for many other embodiments for causing shutter 206 to apply the desired force to receptacle 204. For example, in alternative embodiments, a mechanism other than a spring can cause shutter 206 to apply the desired force against receptacle 204.

Because shutter projections 210 apply pressure to the top side of an optical disc (i.e., the non-reflective side), any minor surface scratch to such non-reflective side caused by shutter projections 210 should not damage the optical disc. That is, shutter projections 210 do not contact the reflective side of an optical disc, and therefore should not damage an optical disc. However, it is conceivable that if shutter 206 applies too much pressure against an optical disc, such that force 212 is very large, then shutter projections 210 may scratch an optical disc deep enough to damage the reflective surface, thereby damaging the disc. Accordingly, in a preferred embodiment, shutter projections 210 are very smooth to reduce the abrasion to an optical disc during loading/unloading to/from optical drive 202. In alternative embodiments, shutter projections 210 can be rotationally implemented within shutter 206, wherein such shutter projections 210 rotate or "roll" across the surface of an optical disc during loading/unloading to/from optical drive 202. Additionally, in a preferred embodiment, the pressure or force 212 applied by shutter projections 210 to an optical disc are sufficient to prevent such optical disc from inadvertently falling out of receptacle 204 during loading/unloading from optical drive 202, but such force 212 is not so great that it will likely damage such optical disc. In a most preferred embodiment, shutter 206 applies a force of approximately 50 grams to an optical disc.

Turning to FIG. 3, a side view of a preferred embodiment is shown. As shown, receptacle 204 extends from optical drive 202 to receive an optical disc from a user for loading or to provide an optical disc to a user for unloading. As shown in FIG. 3, receptacle 204 (e.g., a tray) for transporting an optical disc to/from an optical drive is positioned vertically. Although, it should be understood that in a preferred embodiment the optical drive 202 and receptacle 204 may be oriented in any manner (e.g., vertically or horizontally), and such a preferred embodiment is operable for loading/unloading an optical disc in any such orientation. As also illustrated in FIG. 3, in a preferred embodiment, receptacle 204 comprises a cavity 304 that receives an optical disc to be loaded into optical drive 202. Cavity 304 is formed by a sidewall or "rim" 306. Rim 306 is preferably of a substantially circular shape, and such rim 306 can completely or partially surround (or enclose) cavity 304. Thus, for example rim 306 may be a contiguous circle surrounding cavity 304, or rim 306 may be a non-contiguous (e.g., broken) circle surrounding cavity 304.

Cavity 304 is capable of receiving an optical disc to be transported to the optical drive 202. A user places an optical disc (not shown), such as a CD or DVD, in the cavity 304 of receptacle 204, and shutter projections 210 work to prevent the optical disc from inadvertently falling out of receptacle 204. That is, shutter projections 210 maintain an optical disc in cavity 304 when receptacle 204 is oriented vertically. Thus, a user places an optical disc in cavity 304 between receptacle 204 and shutter 206. In a preferred embodiment, rim 306 comprises one or more "ramped portions" or "ramps" 308 to aid a user in placing an optical disc in cavity 304 and removing an optical disc from cavity 304. That is, ramps 308 are provided on rim 306 to aid in guiding or directing an optical disc to/from cavity area 304.

In the preferred embodiment illustrated in FIG. 3, shutter 206 extends from optical drive 202 over a portion of receptacle 204 to maintain a disc in receptacle 204 during vertical loading/unloading to/from optical drive 202. In a most preferred embodiment, shutter 206 extends over at least approximately ¼ of the diameter of cavity 304 when receptacle 204 is fully extended from optical drive 202. Although, in alternative embodiments, shutter 206 can extend further over cavity 304. For example, in an alternative embodiment, shutter 206 extends over approximately ½ of the diameter of cavity 304 when receptacle 204 is fully extended from optical drive 202. In a preferred embodiment, shutter 206 extends over at least ¼ of an optical disc's diameter that is contained in receptacle 204 when receptacle 204 is fully extended from optical drive 202.

As also shown in FIG. 3, in a preferred embodiment, shutter 206 extends over the portion of cavity 304 that retracts deepest into optical drive 202 when receptacle 204 is retracted. Thus, in a preferred embodiment, shutter 206 extends from optical drive 202 over cavity 304 from the "deep" side of cavity 304 toward the "shallow" side (i.e., the side of cavity 304 that retracts the shallowest depth into optical drive 202 when receptacle 204 is retracted).

Accordingly, in a preferred embodiment, a user can easily insert and remove a disc from receptacle 204 with little effort and without inadvertently damaging such optical disc. If the optical drive 202 is positioned (or "oriented") horizontally, an optical disc can be placed flatly in cavity 304 beneath shutter 206 on the horizontal receptacle. However, if the optical drive 202 is positioned vertically, as shown in FIGS. 2 and 3, an optical disc can be placed upright in cavity 304, and the shutter projections 210 work to prevent the optical disc from inadvertently falling out of cavity 304 of such a vertical receptacle 204. That is, as an optical disc is placed in the vertical receptacle 204, the disc engages the shutter projections 210, and such shutter projections 210 maintain pressure against such optical disc to maintain the disc in the vertical receptacle 204 during loading/unloading to/from optical drive 202.

As an example of the operation of a preferred embodiment, suppose a user desires to insert an optical disc in the vertical receptacle 204 shown in FIGS. 2 and 3. The user can cause receptacle 204 to extend from optical drive 202, e.g., by activating an eject button. Hinged shutter 206 opens (e.g., rotates) upward above the top portion of receptacle 204. In a preferred embodiment, one or more springs compress as shutter 206 opens, causing shutter 206 to apply pressure against receptacle 204. A user then places an optical disc in cavity 304 by pushing or sliding such disc between cavity 204 and shutter 206. In a preferred embodiment, ramps 308 aid the user in directing the optical disc to cavity 304. Accordingly, a user can easily insert and/or remove an optical disc from receptacle 204 without damaging the disc. Once the disc is placed in the cavity area 304 of receptacle 204, the user can release the disc. Thereafter, shutter projections 210 apply sufficient pressure against the disc to prevent the disc from inadvertently falling out of cavity area 304. Thus, the disc will be fed properly to the optical drive 202. When a user unloads the disc from receptacle 204, the user pulls or slides the disc out from between receptacle 204 and shutter 206. Again, in a preferred embodiment, ramps 308 guide the optical disc as the user removes the disc from receptacle cavity 304. The user is not required to perform any additional steps, such as adjusting tabs, to load/unload an optical disc to/from receptacle 204. The user is not required to exert any more effort than just sliding the disc in receptacle cavity 304 and sliding the disc out of receptacle cavity 304. Accordingly, the process of loading/unloading a disc is wieldy for a user and may be accomplished with one hand, as opposed to the cumbersome process of the prior art.

Figure 1:
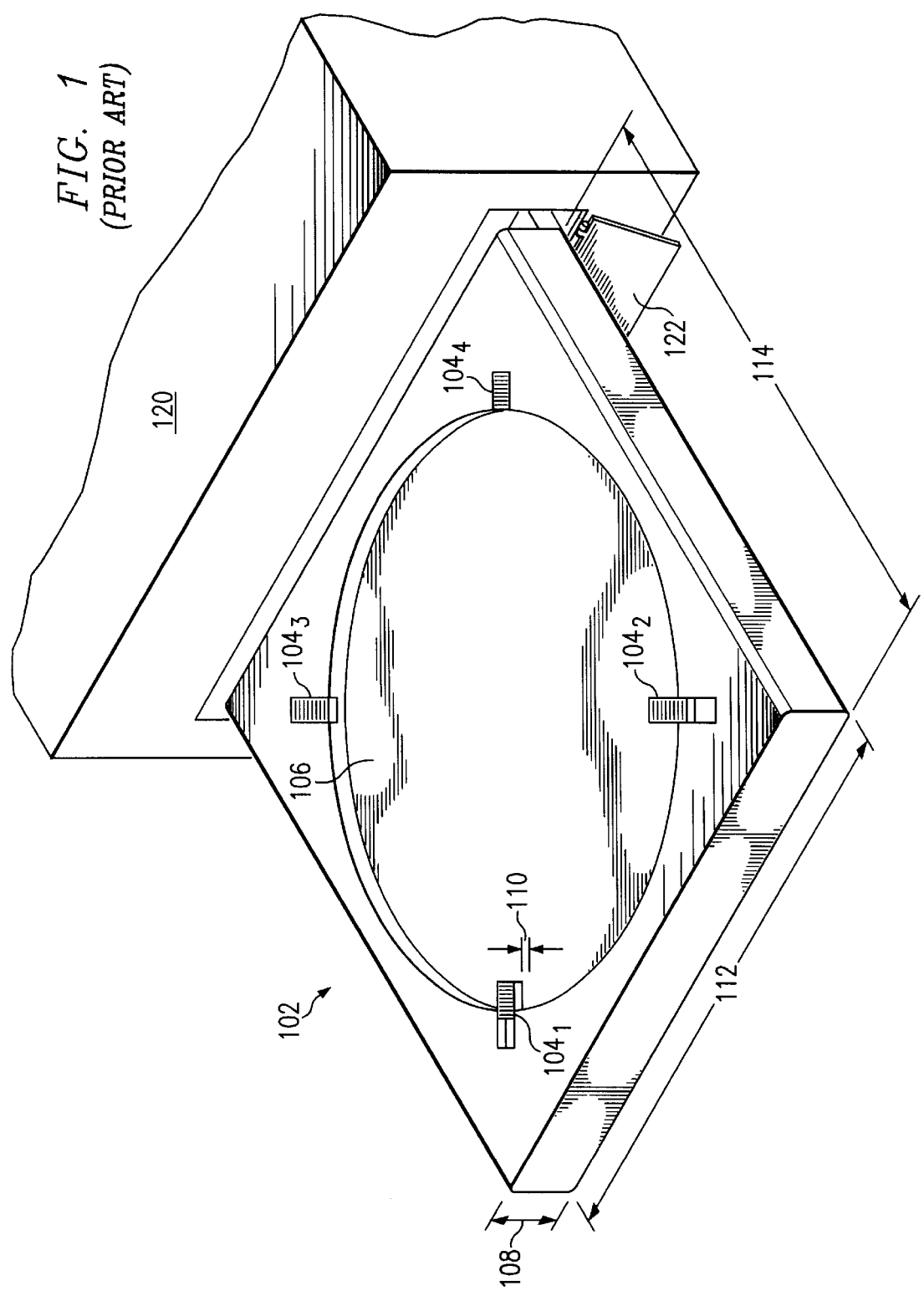
FIG. 1 shows a prior art tray for transporting an optical disc to an optical drive.

As discussed in conjunction with FIG. 1, for ease of explanation and consistency, the dimension 208 of receptacle 204 will be referred to herein as the receptacle's "height" or "thickness" (corresponding to dimension 108 of FIG. 1) and the dimension 312 will be referred to herein as the tray's "length". Because tabs of the prior art are not required on receptacle 204 in a preferred embodiment, receptacle 204 can be implemented with a relatively small height dimension 208. In a preferred embodiment, the height 208 of receptacle 204 is within the range of 10–15 millimeters. In a most preferred embodiment, the height 208 of receptacle 204 is approximately 10 millimeters. Accordingly, a desired low profile is achieved for receptacle 204 in a preferred embodiment. As a result, when such a preferred embodiment is implemented within a larger system, such as a PC, laptop computer, mainframe computer, workstation computer, minicomputer, supercomputer, or other system having an optical drive, the profile of such larger system can be reduced. That is, when a preferred embodiment is implemented within a larger system, the overall height or thickness of such larger system can be reduced, resulting in a lower profile system.

In a most preferred embodiment, 2 shutter projections 210 (i.e., 210$_1$ and 210$_2$) are provided on shutter 206, as shown in FIGS. 2 and 3. Additionally, in a most preferred embodiment, such shutter projections 210 are positioned off-center of cavity 304, such that such shutter projections 210 do not become lodged within the center aperture typically provided in an optical disc as such optical disc is being loaded/unloaded to/from optical drive 202. However, even though 2 shutter projections 210 have been shown and described herein, more or fewer shutter projections 210 may be implemented on shutter 206, and any such implementation is intended to be within the scope of the present invention. The present invention is not intended to be limited only to the 2 shutter projections 210 provided herein, rather such 2 shutter projections 210 are intended as an example that render the disclosure enabling for many other implementations having different numbers of shutter projections 210. For example, alternative embodiments may be implemented having as few as 1 shutter projection 210. For instance, one long shutter projection 210 may extend across the entire length of shutter 206 to maintain an optical disc in receptacle 204 during loading/unloading to/from optical drive 202.

It should be further understood that in alternative embodiments shutter 206 can be implemented without including shutter projections 210 thereon. For example, in alternative embodiments, shutter 206 itself may contact an optical disc to maintain such optical disc in receptacle 204 during loading/unloading to/from optical drive 202. For instance, the edge of shutter 206 can be sufficiently smooth and non-abrasive to permit shutter 206 itself to contact an optical disc without damaging the optical disc.

It should also be understood that a preferred embodiment permits a drive to be oriented in any manner (e.g., vertically or horizontally) and performs loading/unloading to/from an optical drive in any such orientation without requiring modification by a user. For example, a user is not required to manually adjust tabs or other mechanisms for holding an optical disc an a receptacle 204 when orienting the optical drive vertically. Thus, the optical drive may be oriented in any manner in a preferred embodiment without requiring additional effort on the part of the user to allow loading/unloading to/from such drive.

Moreover, it should be understood that a preferred embodiment allows an optical disc to be loaded/unloaded to/from a receptacle 204 easily, with little effort on the part of the user, and in a manner that reduces the potential for inadvertently damaging the disc. Additionally, because the tabs of the prior art are not required in a preferred embodiment, the overall height 208 or thickness of a receptacle 204 is reduced to provide a low profile receptacle, which may allow for a low profile system (e.g., PC, laptop computer, or other computer system that has an optical drive). A most preferred embodiment provides a low profile receptacle 204 that has a height of approximately 10 millimeters. In a preferred embodiment, the optical drive 202 may be implemented as an external drive, or optical drive 202 may be implemented as an internal drive for a computer system.

As described herein, a preferred embodiment can be utilized for loading/unloading an optical disc in any orientation, including either horizontal or vertical. Accordingly, a preferred embodiment can be utilized for loading/unloading an optical disc in an off-axis orientation as provided in co-pending and commonly assigned U.S. patent application Ser. No. 09/411,755, entitled "UNIQUE TRAY GEOMETRY TO ALLOW FOR VERTICAL LOADING OF OPTICAL DISC IN OPTICAL DRIVE." Also, as described herein a preferred embodiment does not require any additional maintaining mechanism other than those provided on shutter 206. However, the present invention is not intended to be limited only to embodiments lacking additional maintaining mechanisms. Rather, the present invention is intended to encompass embodiments that include maintaining mechanisms in addition to those provided on shutter 206 for aiding in maintaining an optical disc in a receptacle 204 for transporting such disc to the optical drive 202. For example, the mechanisms (shutter projections) described in co-pending and commonly assigned U.S. patent application Ser. No. 09/412,036, entitled "ORIENTATION OF DRIVE MECHANICS TO ALLOW FOR DISC LOADING IN AN OFF-AXIS POSITION," can also be implemented with the embodiments provided herein.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An optical drive comprising:
    a body;
    a receptacle that is operable to transport an optical disc to said body by extending from said body and retracting into said body, wherein said receptacle comprises a top side that receives said optical disc; and
    a shutter that is fixed to and extends from said body over at least a portion of said top side of said receptacle, wherein said shutter applies force toward said top side of said receptacle when said receptacle is extended from said body, said force sufficient to maintain an optical disc in said receptacle when said receptacle is oriented vertically.

2. The optical drive of claim 1, wherein said shutter further comprises:
    at least one shutter projection that applies said force toward said top side of said receptacle when said receptacle is extended from said body.

3. The optical drive of claim 1, wherein said shutter is rotatably connected to said body such that said shutter opens upward when said receptacle extends from said body and said shutter closes downward when said receptacle retracts into said body.

4. The optical drive of claim 1, wherein said shutter is rotatably fixed to said body.

5. The optical drive of claim 1, wherein said shutter is springably attached to said body with one or more springs, and wherein said one or more springs compress when said shutter opens upward and said one or more springs relax when said shutter closes downward, whereby said one or more springs cause said shutter to apply said force.

6. The optical drive of claim 1, wherein said receptacle comprises a cavity that receives said optical disc, and wherein said cavity is at least partially surrounded by a rim.

7. The optical drive of claim 6, wherein said rim comprises at least one ramped portion to aid in guiding an optical disc to/from said cavity when said optical disc is being loaded/unloaded to/from said receptacle.

8. The optical drive of claim 7, wherein said shutter extends over at least ¼ of said cavity's diameter.

9. The optical drive of claim 1, wherein said receptacle comprises height, length and depth dimensions, and wherein said shutter is oriented substantially parallel with said length dimension of said receptacle.

10. The optical drive of claim 1, wherein said shutter extends over at least ¼ of said receptacle's diameter.

11. The optical drive of claim 1, wherein said force is at least 50 grams.

12. The optical drive of claim 1, wherein said receptacle comprises height, length and depth dimensions, and wherein said height dimension of said receptacle is within the range of 10 millimeters to 15 millimeters.

13. The optical drive of claim 1, wherein said optical drive is selected from the group consisting of:
    a CD drive and a DVD drive.

14. The optical drive of claim 1, wherein said optical disc is selected from the group consisting of:
    a CD, a DVD, an audio optical disc, a video optical disc, and a multimedia optical disc.

15. A system comprising:
    an optical drive;
    said optical drive comprising a body and a means for transporting an optical disc to said body by extending from said body and retracting into said body, wherein said means for transporting comprises a means for receiving said optical disc;
    said optical drive further comprising a means for maintaining said optical disc within said means for receiving, wherein said means for maintaining is fixed to and extends from said body over at least a portion of said means for receiving and applies force toward said means for receiving when said means for transporting is extended from said body, said force sufficient to prevent said optical disc from inadvertently falling out of said means for receiving when said means for transporting is oriented vertically.

16. The system of claim 15, wherein said optical drive is oriented within said system substantially vertically.

17. The system of claim 15, comprising a computer system selected from the group consisting of:
    a PC, a laptop computer, a mainframe computer, a workstation computer, a minicomputer, and a supercomputer.

18. The system of claim 15, wherein said optical drive is external to said system.

19. A method of loading an optical disc in an optical drive, the method comprising:
    extending a receptacle from a body of said optical drive;
    receiving an optical disc in said receptacle between said receptacle and a shutter that extends over at least a portion of said receptacle, said shutter extending from and being fixed to said body;
    maintaining said optical disc in said receptacle by said shutter applying a force against said optical disc within said receptacle sufficient to maintain said optical disc in said receptacle when said receptacle is oriented vertically; and
    retracting said receptacle into said body to transport said optical disc to said optical drive.

20. The method of claim 19, further comprising: opening said shutter when extending said receptacle from said body; and closing said shutter when retracting said receptacle into said body.

* * * * *